United States Patent [19]

Hall, Jr.

[11] 3,889,905
[45] June 17, 1975

[54] DERAILMENT RESPONSIVE BRAKE APPLYING DEVICE

[76] Inventor: James H. Hall, Jr., 2829 Churchill, Memphis, Tenn. 38118

[22] Filed: Feb. 13, 1974

[21] Appl. No.: 442,056

[52] U.S. Cl............................... 246/170; 251/244
[51] Int. Cl................................................ B61l 3/00
[58] Field of Search ............ 246/170, 171; 137/636, 137/636.1; 251/244, 245, 246

[56] References Cited
UNITED STATES PATENTS

| | | | |
|---|---|---|---|
| 1,613,252 | 1/1927 | Jacques............................. | 246/170 |
| 1,771,511 | 7/1930 | Quelch.............................. | 251/244 |
| 1,956,775 | 5/1934 | Ross................................. | 137/636.1 |

Primary Examiner—M. Henson Wood, Jr.
Assistant Examiner—Reinhard J. Eisenzopf
Attorney, Agent, or Firm—John N. Randolph

[57] ABSTRACT

A safety attachment for application to the center sill and truck bolster of a railroad car for automatically applying the air brakes of the trainline in emergency, automatically when a car wheel becomes derailed. One such safety device is associated with each car truck, and each such device includes a valve supported by the center sill and having a pivotally mounted lever arm disposed between two fixed arms or furcations supported by the truck bolster, so that one of said furcations will strike and move the lever arm sufficiently to open the valve when the truck bolster is subjected to a leverage force of the magnitude resulting from the derailment of a wheel of the truck of which the bolster forms a part.

3 Claims, 4 Drawing Figures

DERAILMENT RESPONSIVE BRAKE APPLYING DEVICE

SUMMARY

It is a primary object of the present invention to provide a brake applying device of extremely simple construction which may be readily associated with each truck of a railroad car and with the center sill of the car, so that the air brakes of the train will be applied in emergency in the event of a derailment of a wheel of said car truck.

Another object of the invention is to provide such a device that is so constructed that leverage forces imparted to the truck bolster when the car is negotiating the sharpest railroad curves will not be sufficient to actuate the safety device to apply the air brakes.

Various other objects and advantages of the invention will hereinafter become more fully apparent from the following description of the drawings, illustrating a presently preferred embodiment thereof, and wherein:

DESCRIPTION OF THE PREFERRED EMBODIMENT

Figure 2:
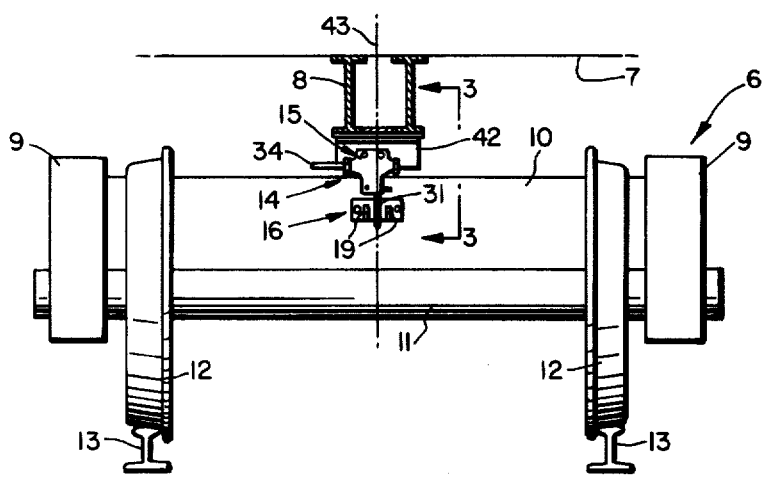
FIG. 2 is an end elevational view of the car truck, showing the center sill in cross section, and showing the safety device applied.
Figure 3:
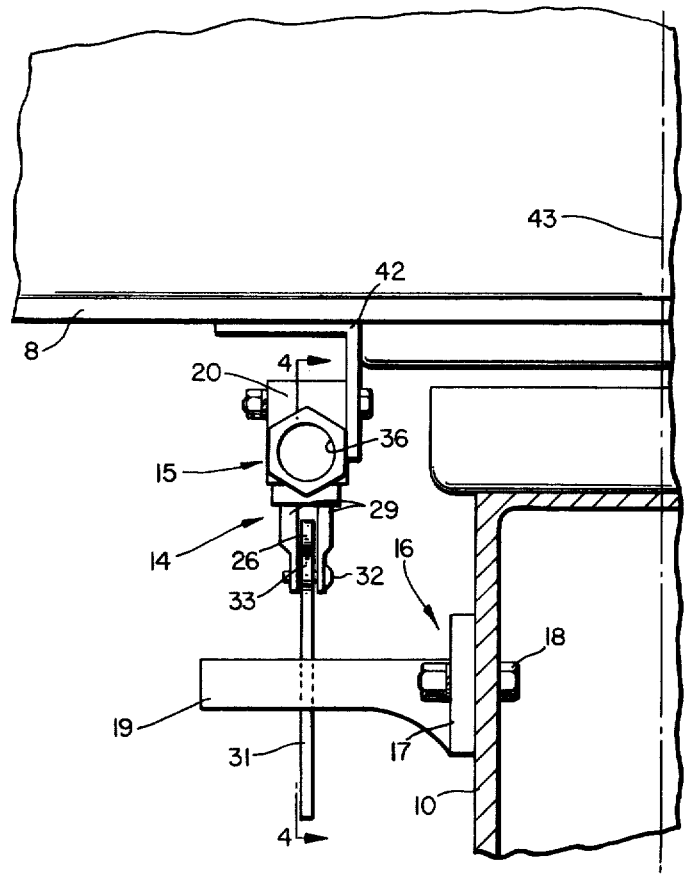
FIG. 3 is an enlarged sectional view, primarily in elevation, taken substantially along a plane as indicated by the line 3—3 of FIG. 2.

Referring more specifically to the drawings, one truck, designated generally 6, of a railway car, a portion of the body of which is indicated at 7 in FIG. 2, partially supports a center sill 8 which provides a support for the car body 7. The truck 6 includes sides 9, a bolster 10, axles 11 and wheels 12 which engage rails 13. The parts previously described are all conventional.

The derailment responsive brake applying device, comprising the invention, is designated generally 14 and includes a valve 15 and a bifurcated member 16. The bifurcated member 16 includes a base plate 17 which is secured by fastenings 18 to the outer surface of one of the upright sides of the bolster 10, and a pair of rigid arms or furcations 19 which are formed integral with or fixed immovably to the plate 17 and which project outwardly therefrom. The furcations 19 are disposed in spaced apart relation to one another in a direction crosswise of the truck 6 and lengthwise of the bolster 10, as clearly illustrated in FIGS. 1 and 2.

Figure 4:
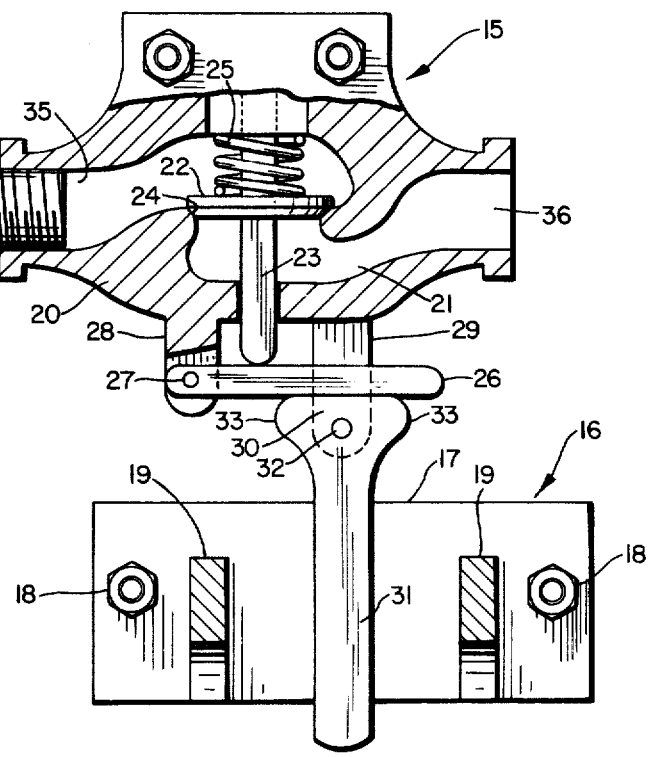
FIG. 4 is an enlarged sectional view taken substantially along a plane as indicated by the line 4—4 of FIG. 3.

The valve 15 is suspended from the center sill 8 by a bracket 42 and includes a housing 20, as best seen in FIG. 4, having a passage 21 extending therethrough. A valve member 22 is supported on a stem 23 within the passage 21, and is urged into engagement with a valve seat 24 of the passage 21 by a compression spring 25 which is mounted on the stem 23, between one side of the valve element 22 and a part of the housing 20, to normally retain the valve element 22 in engagement with the seat 24 for closing the passage 21. The valve 15 also includes a lever 26 which is pivotally mounted at 27 in a slotted depending extension 28 of the casing 20. The lever 26 extends from the extension 28 between a pair of arms 29 which depend from the casing 20. The upper end or head 30 of a lever arm or actuator 31 is swingably mounted by a pivot element 32 between the arms 29 and beneath the lever 26. The head 30 has corresponding rounded ends 33 forming cams, as will hereinafter be described. The lever arm 31 depends from the arms 29 between the furcations 19 and, as seen in FIG. 4, is normally disposed midway between said furcations and mounted to swing about its pivot element toward and away from the furcations.

A branch pipe 34 of the trainline, not otherwise illustrated, is connected to the inlet end 35 of the valve passage 21. The other outlet end 36 of the passage 21 opens to the atmosphere.

Figure 1:
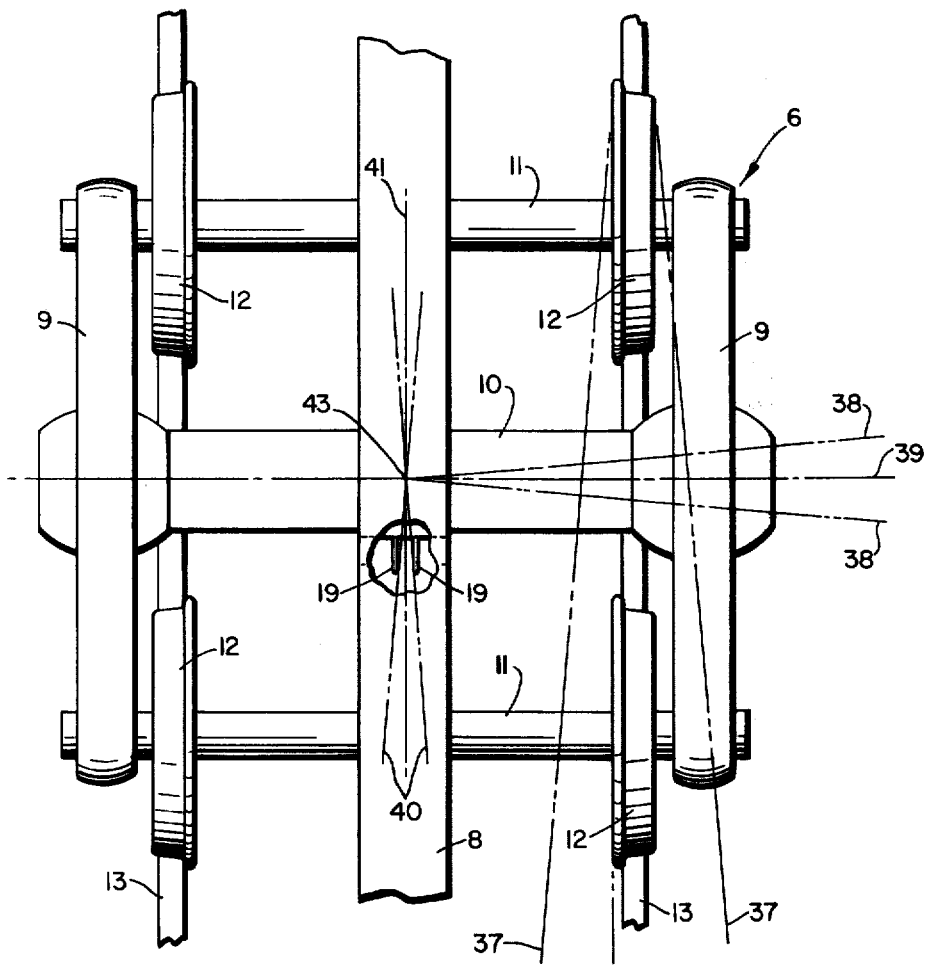
FIG. 1 is a top plan view of a railroad car truck and a part of the center sill shown broken away.

The broken lines 37 in FIG. 1 indicate the angles assumed by the truck sides 9 in the event of the derailment of one of the wheels 12. The broken lines 38 indicate the angles assumed by the bolster 10 relative to the broken line 39, indicating the normal position of said bolster, when said wheel is derailed, and the broken lines 40 designate the angles assumed by the valve handle 31 relative to its normal position, as indicated by the broken line 41, upon derailment of said wheel. Each of said aforementioned angles is greater than the maximum angle assumed by the sides 9, bolster 10 and center sill 8 when the truck 6 is negotiating a maximum curve, so that the safety device 14 will never be actuated by leverage forces exerted on the trucks and center sills when the cars are moving around a sharp curve.

However, when one of the wheels 12 is derailed causing the parts 9, 10 and 8 to assume the angles indicated by the broken lines 37, 38 and 40, respectively, the bolster 10 will pivot on axis 43 in one direction or the other to a sufficient extent to cause one of the furcations 19 to strike and rock the lever arm 31 sufficiently about its pivot 32, so that one of the cam portions 33 will move into engagement with the underside of the lever 26 to swing it upwardly about its pivot 27, to displace the valve stem 23, which is resting on said lever 26, upwardly against the action of the spring 25, for moving the valve element 22 upwardly off of the seat 24 into the inlet portion 35 of the passage 21 to release the air pressure in the brakeline through its branch 34 and passage 21 to the atmosphere, for applying the air brakes in emergency to the wheels of all of the cars of the train.

As heretofore stated, one of said brake applying devices 14 is associated with each truck 6 of each car of the train so that a derailment of a wheel of any car will cause the air brakes to be applied in emergency.

Various modifications and changes are contemplated and may be resorted to, without departing from the function of scope of the invention.

I claim as my invention:

1. A derailment responsive brake applying device comprising a normally closed valve, means supporting said valve immovably on a railway car center sill, said valve including a housing having an inlet end connected to a trainline branch pipe and an outlet end opening to the atmosphere, a valve actuator connected to and extending from said housing and supported relative thereto for movement crosswise of the center sill, and a bifurcated member secured immovably to an exterior part of one side wall of a truck bolster of the railway car and having rigid furcations transversely spaced relative to the center sill and between which said valve actuator is disposed, whereby a twisting or transverse movement imparted to the bolster due to the derailment of a wheel of the truck will cause one furcation to engage and move the valve actuator to a position to open the valve to depressurize the brake line for applying the train brakes in emergency.

2. A brake applying device as in claim 1, said valve actuator being normally disposed between and spaced equal distances from said furcations.

3. A brake applying device as in claim 1, said valve actuator being swingably supported on the valve housing, a lever pivotally supported on the valve housing and resting on an end of the valve actuator disposed adjacent to the swingably mounted end thereof, a valve stem reciprocably mounted in the valve housing and having one end resting on said lever, a valve element carried by said stem and normally disposed in a position for closing the passage of the valve housing, and said valve actuator having cam portions selectively engageable with said lever when the valve actuator is moved by one of said furcations for rocking the lever to displace the valve stem and the valve element carried thereby to an open position of the valve.

* * * * *